United States Patent [19]

Samejima et al.

[11] 4,128,828

[45] Dec. 5, 1978

[54] DIFFERENTIAL DETECTION SYSTEMS WITH NON-REDUNDANT ERROR CORRECTION

[75] Inventors: Shuichi Samejima, Yokohama; Kenkichi Hirade, Yokosuka, both of Japan

[73] Assignee: Nippon Telegraph and Telephone Public Corp., Japan

[21] Appl. No.: 836,759

[22] Filed: Sep. 26, 1977

[30] Foreign Application Priority Data

Sep. 28, 1976 [JP] Japan .................................. 51-116271
Jul. 25, 1977 [JP] Japan .................................. 52-89014

[51] Int. Cl.² .............................................. G06F 11/12
[52] U.S. Cl. ............................ 340/146.1 AQ; 325/41
[58] Field of Search ............ 340/146.1 AQ, 146.1 AB; 325/41

[56] References Cited

U.S. PATENT DOCUMENTS

| 3,529,290 | 9/1970 | Schroeder et al. | 340/146.1 AB |
| 3,891,959 | 6/1975 | Tsuji et al. | 340/146.1 AQ |
| 3,939,473 | 2/1976 | Fuchs | 325/41 |
| 3,978,406 | 8/1976 | Matsumoto et al. | 340/146.1 AQ |
| 4,035,767 | 7/1977 | Chen et al. | 340/146.1 AQ |
| 4,055,832 | 10/1977 | En | 340/146.1 AQ |

Primary Examiner—Charles E. Atkinson
Attorney, Agent, or Firm—Charles W. Helzer

[57] ABSTRACT

The differential detection system comprises a demodulator for a modulated carrier transmission system for binary signals, in which a symbol detected from the phase difference between the received signal delayed by one signaling interval and the signal received in the present signaling interval is converted into data and a symbol detected from the phase difference between the received signal delayed by two signaling intervals and a signal received in the present signaling interval is converted into parity. The data and the parity are applied to a decoder for a rate ½ single error correcting self-orthogonal convolutional code effecting demodulation with non-redundant error correction. The correction system is also applicable to demodulate a carrier wave modulated by m (an integer) level digital data.

9 Claims, 19 Drawing Figures

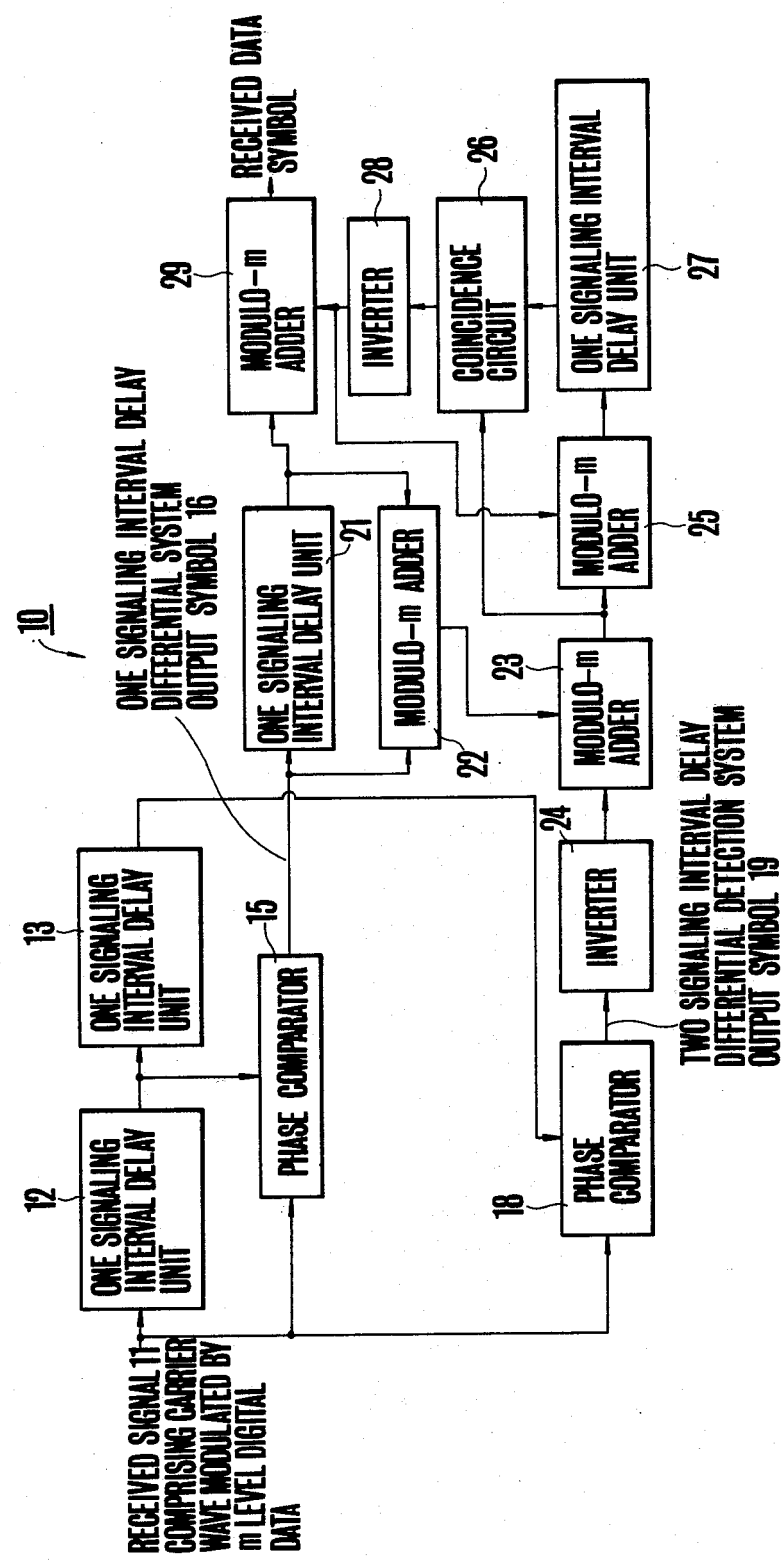
F I G. 1

FIG.3(a)
FIG.3(b)
FIG.3(c) φ
FIG.3(d) φ₀
FIG.3(e) φ-φ₀
FIG.3(f) sin
FIG.3(g)
FIG.3(h) φ'
FIG.3(i) φ-φ'
FIG.3(j) cos
FIG.3(k)
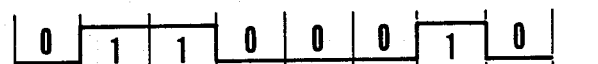
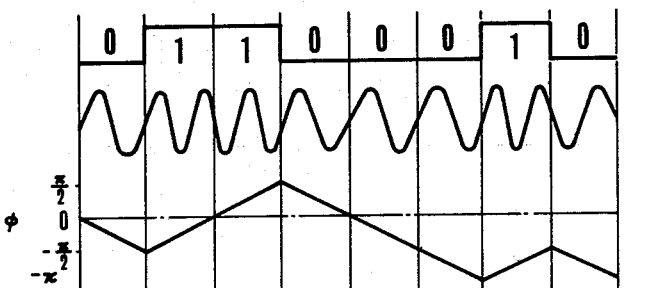
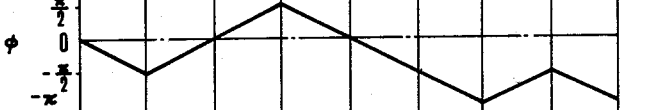
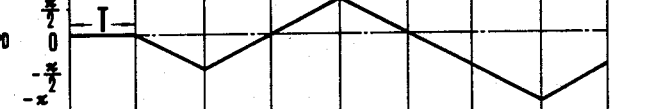
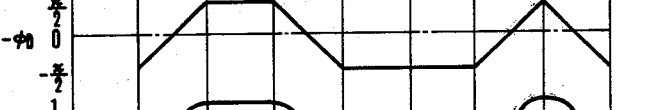
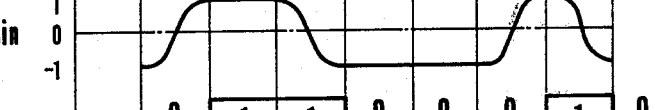
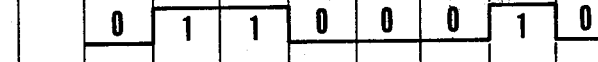
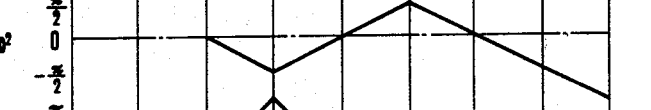
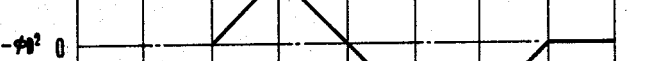
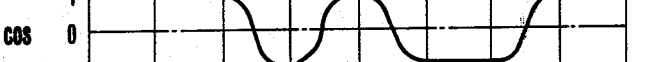
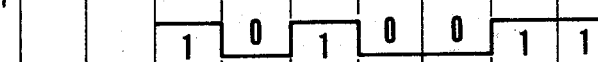

DIFFERENTIAL DETECTION SYSTEMS WITH NON-REDUNDANT ERROR CORRECTION

BACKGROUND OF THE INVENTION

This invention relates to a differential detection system and more particularly to a differential detection system with non-redundant error correction for a modulated carrier transmission system conveying multilevel digital signals such as a multilevel differential phase shift keying (DPSK) system and a multilevel continuous phase frequency shift keying (CPFSK) system.

Demodulation systems for modulated carrier transmission system utilizing multilevel digital signals generally include a coherent demodulation system and a differential detection system. The coherent detection system is advantageous in that it can efficiently utilize the received power and has an excellent error rate performance. However, when this system is applied to a TDMA satellite communication system several symbols are necessary for recovering the reference carrier in each of the burst signals thereby degrading the transmission efficiency. On the other hand, with the differential detection system it is possible to decrease the number of symbols for carrier recovery to one so that it is possible not only to improve the transmission efficiency but also to simplify the construction of the apparatus. However, the error rate performance of the differential detection system is poor.

The invention contemplates improvement of the error rate performance of differential detector system while preserving the advantages thereof. To have better understanding of this invention a typical differential detection system will firstly be described briefly. In the prior art differential detection system, a phase comparator is used for comparing the phase of the signal produced by delaying the received signal by one signaling interval with the phase of the signal received in the present signaling interval and a symbol detected by the phase comparator is utilized as a received data symbol. However, with this system the inherent redundancy that a symbol detected by a phase comparator which compares the phase of the received signal delayed by two signaling intervals with the phase of the signal received in the present signaling interval corresponds to a modulo m addition of the data symbol detected in the present signaling interval and the data symbol detected in the preceding signaling interval is not utilized so that the error rate performance of the demodulated output is poor. Even when the inherent redundancy is utilized, the circuit configuration becomes complicated with the result that it has been difficult to operate at high symbol transmission rate in spite of the improvement in the error rate performance.

It is thought that the system disclosed in U.S. Pat. No. 3,529,290 is closest to this invention. The system disclosed in this patent relates to an error detection and correction technique in which additional redundancy essential for the well known parity principle is not utilized. To this end, a signal produced by delaying by one signaling interval the received differentially encoded phase modulated signal and a signal produced by delaying by two signaling intervals the received signal are prepared and these signals are then combined with the signal received in the present signaling interval to form a redundant information necessary for detecting error and correction thereof. In this system, since a circuit for detecting the presence of an error and a circuit for correcting the error are independent from each other, the signal processing system is relatively complicated. Furthermore, this system is constructed to correct the error only when two errors occur consecutively regardless of the type of the errors thus not making use of the informations regarding the type of the errors. As above described, since the signal processing system is complicated it is difficult to increase the transmission speed of the data or symbols.

SUMMARY OF THE INVENTION

Accordingly, it is an object of this invention to provide a novel differential detection system with non-redundant error correction capable of detecting, and correcting errors in the received signal of the modulated carrier transmission system for digital data.

Another object of this invention is to provide an improved differential detection system with non-redundant error correction capable of detecting, and correcting an error each time such error occurs in the received signal of the modulated carrier transmission system for digital data.

Still another object of this invention is to provide a differential detection system with non-redundant error correction having a simplified circuit configuration but can improve the error rate performance and does not decrease the symbol transmission rate than the prior art system.

According to this invention there is provided a differential detection system with non-redundant error detection comprising first delay means for delaying by $n$ ($n$ is an integer) signaling intervals a received signal comprising a carrier wave modulated by $m$ ($m$ is an integer) level digital data; a first phase comparator for comparing the phase of the output of the first delay means and the phase of a signal received in the present signaling interval to detect a first symbol; second delay means for delaying the first mentioned received signal by $2n$ signaling intervals; a second phase comparator for comparing the phase of the output of the second delay means and the phase of the signal received in the present signaling interval to detect a second symbol; and a decoder responsive to the first and second symbols produced by the first and second phase comparators respectively, said decoder comprising third delay means for delaying the first symbol by $n$ signaling intervals, a first modulo $m$ adder for performing a modulo $m$ addition operation of the output of the first delay means and the first symbol, a second modulo $m$ adder for performing a modulo $m$ addition operation of the output of the first modulo $m$ adder and an inverter output of the second phase comparator, a third modulo $m$ adder connected to receive the output of the second modulo $m$ adder, fourth delay means for delaying the output of the third modulo $m$ adder by n signaling intervals, a logic circuit for determining the coincidence between the output of the fourth delay means and the output of the second modulo $m$ adder, a fourth modulo $m$ adder for performing a modulo $m$ addition operation of an inverted output of the logic circuit and the output of the third delay means, and means for applying the inverted output of the logic circuit to one input of the third modulo $m$ adder.

BRIEF DESCRIPTION OF THE DRAWINGS

The detail of the organization and operation of the invention can be more fully understood from the following detailed description taken in conjunction with the accompanying drawings in which:

FIG. 1 is a block diagram showing one example of the differential detection system of this invention with non-redundant error correction;

FIGS. 3a through 3k show waveforms useful to explain the operation of various parts of the demodulator shown in FIG. 2;

DESCRIPTION OF THE PREFERRED EMBODIMENT

Figure 2:
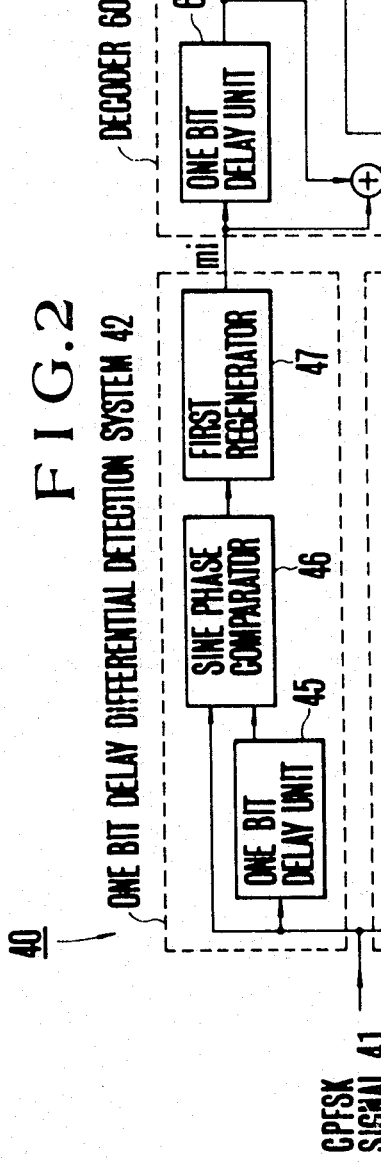
FIG. 2 is a block diagram showing one example of a demodulator utilized in the differential detection system with non-redundant error correction when the system is applied to a binary CPFSK modulated signal wave.

The basic concept of this invention will firstly be described.

In a modulated carrier transmission system for $m$-level digital data (where $m$ is an integer larger than 2), one of the $m$-level data symbols is transmitted by one of the $m$-different signaling waveforms in one signaling interval or time slot. For example, in a $m$ phase DPSK (differential phase shift keying) modulation system one of the $m$-level data is transmitted by one of the sinusoidal waves with $m$ different phases. Denoting the transmission data symbol in the $i$th signaling interval (where $i$ is an integer) by $a_i$, the transmission phase $\theta_i$ of the $i$th of signaling interval will be expressed as follows.

$$\theta_i = \theta_{i-1} + \frac{2\pi}{m} \cdot a_i = \theta_{i-1} + \alpha_i$$

where $\theta_{i-1}$ represents the transmission phase of the $(i-1)$st signaling interval and $$\alpha_i = \frac{2\pi}{m} \cdot a_i.$$

And so when the transmission phase of the $(i-2)$nd signaling interval is denoted by $\theta_{i-2}$, and the $(i-1)$st transmission data symbol by $a_{i-1}$, $$\alpha_{i-1} = \frac{2\pi}{m} \cdot a_{i-1}$$

so that $$\theta_i = \theta_{i-2} + \alpha_{i-1} + \alpha_i$$

By denoting the received phases corresponding to the transmission phases $\theta_i$, $\theta_{i-1}$ and $\theta_{i-2}$ by $\theta_i^r$, $\theta_{i-1}^r$ and $\theta_{i-2}^r$, respectively, a symbol $d_i$ is produced as the received symbol in the $i$th signaling interval when the phase difference $(\theta_i - \theta_{i-1})$ between a received signal delayed by one signaling interval and a received signal in the present signaling interval satisfies the next equation $$\frac{2\pi}{m} \cdot d_i - \frac{\pi}{m} \leq \theta_i^r - \theta_{i-1}^r < \frac{2\pi}{m} \cdot d_i + \frac{\pi}{m}$$

where $d_i = 0, 1 \ldots (m-1)$.

When there is no phase error caused by noise, the phases of the transmitted wave and the received wave coincide with each other, and so $$\theta_i^r - \theta_{i-1}^r = \theta_i - \theta_{i-1} = \alpha_i = \frac{2\pi}{m} \cdot a_i$$

Accordingly, we obtain $$\frac{2\pi}{m} \cdot d_i - \frac{\pi}{m} \leq \frac{2\pi}{m} \cdot a_i < \frac{2\pi}{m} \cdot d_i + \frac{\pi}{m}$$

By simplifying this equation we obtain $$d_i - \tfrac{1}{2} \leq a_i < d_i + \tfrac{1}{2}$$

thereby obtaining $d_i = a_i$. This is termed a one signaling interval delay differential detection system output symbol.

In the absence of noise, the phase difference between a received signal which is delayed by two signaling intervals and the received signal in the present signaling interval is expressed by $$\theta_i^r - \theta_{i-2}^r = \theta_i - \theta_{i-2} = \alpha_{i-1} + \alpha_i$$
$$= \frac{2\pi}{m} \cdot a_{i-1} + \frac{2\pi}{m} \cdot a_i = (a_{i-1} + a_i) \frac{2\pi}{m}.$$

The detectable phase difference ranges between 0 and $2\pi$. Consequently, the following equation is derived out from the equation described above for a case involving no error.

$$\theta_d = (a_{i-1} + a_i) \frac{2\pi}{m} \cdot \text{modulo } 2\pi$$
$$= (a_{i-1} + a_i) \text{ modulo } m \cdot \frac{2\pi}{m}$$

Consequently, by using a similar relationship as in the one signaling interval delay differential detection system, two signaling intervals delay differential detection system output symbol can be determined as $$P_i = (a_{i-1} + a_i) \text{ modulo } m$$

from an equation $$\frac{2\pi}{m} \cdot P_i - \frac{\pi}{m} \leq (a_{i-1} + a_i) \text{ modulo } m \cdot \frac{2\pi}{m}$$
$$\leq \frac{2\pi}{m} \cdot P_i + \frac{\pi}{m}$$

This means that the output symbol correspond to the modulo $m$ sum of the adjacent data symbols.

In the case of a $m$-level CPFSK (continuous phase frequency shift keying) modulation system, $m$ data are transmitted as $m$ sinusoidal waves having different frequencies. Denoting the transmission data symbol in the $i$th signaling interval by $a_i$, the center frequency by $f_0$ and the signaling interval by T, the frequency of the transmitting wave is expressed by $$f_i = f_0 + \frac{2a_i - (m-1)}{m} \cdot \frac{1}{2T}.$$

Consequently, the phase of the transmitting wave after one signaling interval advances by $$\Delta \theta = \frac{2a_i - (m-1)}{m} \cdot \pi$$

with reference to the phase of the wave at the center frequency. There are m waves having different initial phases $$-\frac{(m-1)}{m} \cdot \pi, -\frac{(m-3)}{m} \cdot \pi,$$
$$\ldots -\frac{1}{m}\pi, \frac{1}{m}\pi \ldots \frac{(m-1)}{m} \cdot \pi,$$

respectively, for each of the $m$ sinusoidal waves having different frequencies so that a wave whose phase is continuous with that of the wave in the preceding signaling interval is selected as a wave to be sent out in a given signaling interval.

Denoting the transmitting data symbols in the $i$th and $(i-1)$st signaling intervals by $a_i$ and $a_{i-1}$ respectively, and the phase of the signal at the rear end of the $(k-2)$nd signaling interval by $\theta_{i-2}$, the phase of the signal at the rear end of the $i$th signaling interval will be given by the following equation, $$\theta_i = \theta_{i-1} + \frac{2a_i - (m-1)}{m} \cdot \pi$$
$$= \theta_{i-2} + \frac{2(a_i + a_{i-1}) - 2(m-1)}{m} \cdot \pi$$

Consequently, the output of the one signaling interval delay system can be obtained as $d_i = a_i$ from an equation $$\theta_i - \theta_{i-1} = \frac{2a_i - (m-1)}{m} \cdot \pi$$

where the following equation holds $$\frac{2d_i - (m-1)}{m} \cdot \pi - \frac{\pi}{m} \leq \theta_i - \theta_{i-1} < \frac{2d_i - (m-1)}{m} + \frac{\pi}{m}$$

provided that $d_i = 0, 1 \ldots (m-1)$.

On the other hand, the output of the two signaling interval delay system under a condition of $-\pi \leq \theta_i - \theta_{i-2} < \pi$ is obtained to be $$P_i = (a_i + a_{i-1}) \text{ modulo } m$$

from the equation $$\theta_i - \theta_{i-2} = \frac{(a_i + a_{i-1}) - (m-1)}{m} \cdot 2\pi \text{ modulo } 2\pi$$
$$= \frac{(a_i + a_{i-1}) \text{ modulo } m - (m-1)}{m} \cdot 2\pi$$

provided that $$\frac{P_i - (m-1)}{m} \cdot 2\pi - \frac{\pi}{m} \leq \theta_i - \theta_{i-2} \frac{P_i - (m-1)}{m} \cdot 2\pi + \frac{\pi}{m}$$

Now it will be shown that this invention is applicable to a case wherein the output $d_i$ of the one signaling interval delay system corresponds to the transmission data symbol $a_i$ and the output $P_i$ of two signaling intervals delay system corresponds to the modulo $m$ addition value of the adjacent transmission data symbols $a_{i-1}$ and $a_i$.

Consider now a case wherein an error is caused by a noise on the transmission channel. In such case, it is possible to consider that the receiving symbol corresponds to a modulo $m$ addition value of the transmitting symbol and the error symbol caused by the transmission channel error. Consequently, the one signaling interval delay differential detection system output symbol $r_{di}$ and the two signaling intervals delay differential detection system output symbol $r_{pi}$ are expressed respectively by $$r_{di} = d_i + e_{di} = a_i + e_{di}$$

$$r_{pi} = P_i + e_{pi} = a_i + a_{i-1} + e_{pi}$$

where $e_{di}$ and $e_{pi}$ represent corresponding error symbols respectively.

The output $r_{di-1}$ of the one signaling interval differential detection system of the previous signaling interval is expressed by the next equation.

$$r_{di-1} = a_{i-1} + e_{di-1}$$

Using $r_{di}$, $r_{di-1}$ and $r_{pi}$, a syndrome is formed according to the following equations.

$$S_i = r_{di} + r_{di-1} - r_{pi}$$
$$= a_i + e_{di} + a_{i-1} + e_{di-1} - a_i - a_{i-1} - e_{pi}$$
$$= e_{di} + e_{di-1} - e_{pi}$$

thus obtaining a relationship involving only error symbols. In the same manner, the syndrome of the previous signaling interval can be expressed as follows.

$$S_{i-1} = e_{di-1} + e_{di-2} - e_{pi-1}$$

The effect of the error of the receiving data symbol of the $(i-2)$nd signaling interval is considered to be eliminated by assuming that $e_{di-2} = 0$, thus to obtain the next equation.

$$S_{i-1} = e_{di-1} - e_{pi-1}$$

Now it is possible to determine the value of $e_{di-1}$ so long as there is only one element having a value other than 0 among four elements $e_{di}$, $e_{di-1}$, $e_{pi}$ and $e_{pi-1}$ that constitute $S_i$ and $S_{i-1}$. More particularly, (i) if both $S_i$ and $S_{i-1}$ are 0, $e_{di-1} = 0$, (ii) if $S_i \neq 0$ and $S_i = 0$, $e_{di-1} = 0$ (iii) if $S_i = 0$ and $S_{i-1} \neq 0$, $e_{di-1} = 0$ (iv) if $S_i = S_{i-1} = n \neq 0$, $e_{di-1} = n$ Accordingly, provided that only one of the four elements involves error it is possible to determine $e_{di-1}$, and to correctly demodulate the transmission data symbol of the $(i-1)$st signaling interval by subtracting $e_{di-1}$ from $r_{di-1}$. This can be expressed by the following equation.

$$r_{di-1} - e_{di-1} = a_{i-1} + e_{di-1} - e_{di-1} = a_{i-1}$$

FIG. 1 shows one example of a demodulator according to the principle of this invention just analyzed. As shown, in the demodulator 10 the received signal 11 received through a predetermined transmission medium and comprising a carrier wave modulated by $m$ level digital data is applied to one signaling interval delay units 12 and 13. The received signal is also applied to a phase comparator 15 which compares the received signal that has been delayed by one signaling interval by the delay unit 12 with the received signal in the present signaling interval and its output is derived out as one signaling interval delay differential detection system output symbol 16. The received signal 11 is also applied to another phase comparator 18 which compares the received signal that has been delayed by two signaling intervals by delay unit 13 with the received signal in the present signaling interval, and the output of the comparator is derived out as the two signaling intervals delay differential detection system output symbol 19.

The one signaling interval delay differential detection system output symbol 16 is sent to one signaling interval delay unit 21 as well as to a modulo $m$ adder 22 which also receives the output of the one signaling interval delay unit 21 so as to apply its output to a modulo $m$ adder 23.

The modulo $m$ adder 23 is also connected to receive the output of the phase comparator 18, that is the two signaling intervals delay differential detection system output symbol 19 via an inverter 24. The modulo $m$ adder produces a syndrome by adding these two inputs. The syndrome is applied to a modulo $m$ adder 25 and a coincidence circuit 26. The output of the modulo $m$ adder 25 is applied to a one signaling interval delay unit 27 and the delayed output thereof is applied to the coincidence circuit 26. This coincidence circuit 26 produces a symbol equal to the input when the output of the delay unit 27 corresponding to the syndrome of the previous signaling interval and the output of the adder 23 corresponding to a syndrome of the present signaling interval coincide with each other but produces a zero symbol in other cases. The output of the coincidence circuit 26 is inverted by an inverter 28 and then applied to a modulo $m$ adder 29 which is connected to also receive the output of the one signaling interval delay unit 21 which is the received signal of the previous signaling interval. Consequently, the modulo $m$ adder 29 produces a received data symbol from which an error has been removed.

The output of the inverter 28 is also applied to the modulo $m$ adder 25. Accordingly, in response to the syndrome of the present signaling interval and the output of the inverter 28, the modulo $m$ adder removes the effect of the error of the received data symbol in the $(i-1)$st signaling interval from the syndrome thereby supplying to the delay unit 27 a syndrome from which the effect of the error in the received data symbol in the $(i-1)$st signaling interval has been removed.

In this manner, it is possible to obtain a correct received data symbol from the adder 29 when the number of the transmission channel errors is less than 1.

In carrying out the invention, the symbol transmission rate is limited mainly by the sum $t_d$ of the propagation delay time of the logic circuit constituting the coincidence circuit 26, inverter 28 and the modulo $m$ adder 24. Consequently, the maximum symbol transmission rate is represented by $1/t_d$ symbols/sec. For this reason, when the above described circuits are constituted by high speed logic circuits such as current mode logics (CML) for example, a symbol transmission rate higher than 100 M symbols/sec can readily be obtained.

In the foregoing, in a differential phase shift keying (PSK) modulation system, the transmission data is transmitted by converting it into a phase difference between adjacent signaling intervals. But is is possible in general to transmit the data by converting it into a phase difference between signaling intervals spaced by $(n-1)$ signaling intervals where n represents a positive integer. In the latter case, the received data symbol is detected from the phase difference between the received signal delayed by $n$ signaling intervals and the signal received in the present signaling interval and the symbol which is detected from the phase difference between a received signal delayed by $2n$ signaling intervals and the signal received in the present signaling interval corresponds to the modulo $m$ addition of the received data detected in the present signaling interval and the received data detected in a signaling interval $n$ signaling intervals before. Hence, in this case, $n$ signaling intervals delay units are substituted for the delay units 12, 13, 21 and 27 shown in FIG. 1.

From the foregoing description it will be noted that it is possible to improve the error rate of the transmission symbol by utilizing the two signaling intervals delay differential detection system output symbol as the redundant symbol and by detecting the error symbol from the relationship between the syndrome in a signaling interval $n$ intervals before and the present syndrome.

FIG. 2 shows one example of the differential detection system with one-redundant error correction corresponding to the system shown in FIG. 1 when a binary CPFSK modulation signal is used. The invention will be more fully understood from this example. In the circuit shown in FIG. 2, the demodulator 40 applies a phase continuous frequency shift keying (CPFSK) signal 41 to one bit delay differential detection system 42 and two bits delay differential detection system 43. This signal is shown in FIG. 3b and is obtained by modulating the carrier wave by a binary data sequence comprising "1" and "0" shown in FIG. 3a. The binary FSK system utilizes two signals having frequencies $f_1$ and $f_2$ (where $f_1 > f_2$). There is a relationship $$(f_1 - f_2) T = 0.5$$

among the two frequencies and the one bit interval T. The center frequency of the modulated signal 41 is $(f_1 + f_2)/2$, and in accordance with the data $a_i$ which shows the data at the $i$th signaling interval having a content of either "1" or "0" the frequency of the transmitting signal is switched as follows.

$$\frac{f_1 + f_2}{2} - (-1)^{a_i} \cdot \left(\frac{f_1 - f_2}{2}\right)$$

Taking the phase of a carrier wave having the center frequency $(f_1 + f_2)/2$ as a reference, the phase of the modulated signal advances by $\pi/2$ in T second when the data is "1" whereas delays by $\pi/2$ when the data is "0". As a consequence, the phase variation of the modulation signal is shown by FIG. 3c.

This modulation signal 41 is processed by the one bit delay differential detection system 42 in the following manner. At first, the modulation signal 41 is sent to a delay unit 45 that delays the signal by one bit. The phase variation $\phi$ at the output of the delay unit 45 is the one bit delayed version of the phase variation $\phi$ of the modulation signal 41 shown in FIG. 3c. This output is sent to a sine phase comparator 46 adapted to compare the phases of the modulation signal 41 and the output of the delay unit 43. More particularly, when comparing the phase $\phi$ of the modulation signal 41 and the phase $\phi_D$ of the one bit delayed signal there is a phase difference of $+\pi/2$ or $-\pi/2$ as shown in FIG. 3e at the rear end of one signaling interval. For this reason, the comparator 46 produces an output having a wave form as shown in FIG. 3f, and this output is sent to a first regenerator 47. This regenerator regenerates the symbol by making $+1$ to correspond to the data of "1" and $-1$ to the data of "0" thereby producing a transmission data sequence as the one bit delay differential detection system output.

The modulation signal 41 is processed by the two bits delay differential detection system 43 in the following manner. At first, the modulation signal 41 is sent to the two bits delay unit 50 which delays the modulation signal 41 by two bits to produce a output whose phase variation $\phi_{D2}$ is as shown in FIG. 3h. This output is applied to a cosine phase comparator 51 which compares the phases of the modulation signal 41 and of the output of the two bits delay unit 50.

When comparing the phase $\phi$ of the modulation signal 41 with the phase $\phi_{D2}$ of the two bits delayed signal, the phase difference $\phi - \phi_{D2}$ is as follows. Where adjacent data are

| | |
|---|---|
| "1" and "1" | $\pi$ |
| "1" and "0" or "0" and "1" | $o$ |
| "0" and "0" | $-\pi$ |

Accordingly, as shown in FIG. 3j, the output of the cosine phase comparator 51 is as follows

| | |
|---|---|
| where "1" and "1" or "0" and "0" | $-1$ |
| "1" and "0" or "0" and "1" | $+1$ |

The output of the comparator 51 is sent to a second regenerator 52 to convert $+1$ to "1" and $-1$ to "0" for producing an output as shown in FIG. 3k, which output comprising the output of the two bits delay differential detection system 43. Thus, when the bit of the present signaling interval and the bit of a preceding signaling interval are equal the output is "0" but when they differ the output is "1". This corresponds to the parity check sum of the adjacent transmission data bits. Denoting the output of the one bit delay differential detection system 42 at the $i$th signaling interval by $a_i$, and of the $(i-1)$st signaling interval by $a_{i-1}$, following relationship among $a_i$, $a_{i-1}$ and the output $b_i$ of the two bits delay differential detection system 43 holds.

$$b_i = a_i \oplus a_{i-1}$$

where symbol $\oplus$ means the addition of modulo 2.

Figure 4:
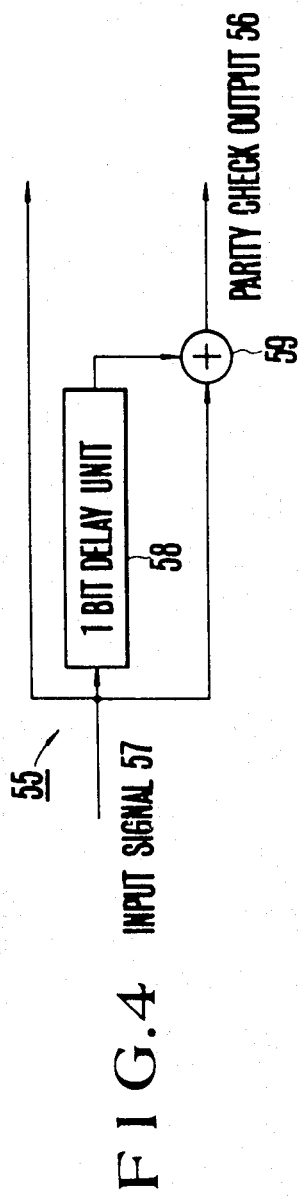
FIG. 4 is a block diagram showing the basic configuration of a rate ½ single error correcting self-orthogonal code encoder.

This relationship is the same as the relationship among the parity check sum output 56 and input signals 57 of the encoder 55 for the rate ½ single error correcting self-orthogonal convolutional code, shown in FIG. 4. In FIG. 4, reference numeral 58 shows an one bit delay unit and 59 a modulo 2 adder. As above described, since the relationship between the outputs $a_i$ and $b_i$ is the same as the relationship between the data and parity it is possible to improve the error rate performance by the unique utilization of the redundancy inherent to the detection method and by using a decoder for the above described code.

For this reason, in the circuit shown in FIG. 2, the outputs of the one bit delay differential detection system 42 and the two bits delay differential detection system 43 are used as the data and parity inputs to the decoder 60 for the rate ½ single error correcting self-orthogonal code.

As above described, where the transmitted data sequence is denoted by $a_i$, the output of the one bit delay differential detection system 42 by $m_i$, and the output of the two bits delay differential detection system 43 by $n_i$ and error symbols which become "1" in the presence of a symbol error but "0" in the absence of the symbol error by $e_{mi}$ and $e_{ni}$ respectively, the following equations hold:

$$m_i = a_i \oplus e_{mi}$$

$$n_i = a_i \oplus a_{i-1} \oplus e_{mi}$$

According to the analysis described above the output of the one bit delay differential detection system 42 is applied to the one bit delay unit 61 and its output is applied to a modulo 2 adder 62 together with the output of the one bit delay differential detection system 42. The output of the modulo 2 adder 62 is applied to a modulo 2 adder 63 together with the output of the two bits delay differential detection system 43.

Accordingly, the syndrome of the output of this adder 63 can be expressed as follows:

$$S_i = m_i \oplus m_{i-1} \oplus n_i$$

$$= a_i \oplus e_{mi} \oplus a_{i-1} \oplus e_{mi-1} \oplus a_i \oplus a_{i-1} \oplus e_{ni}$$

$$= e_{mi} \oplus e_{mi-1} \oplus e_{ni}$$

Assuming now that the effect of $e_{mi-2}$ has already been eliminated from the syndrome of the previous signaling interval this syndrome can be shown by $$S_{i-1} = e_{mi-1} \oplus e_{ni-1}.$$

Whether $e_{mi-1}$ is "0" or "1" can be judged when less than one of $e_{mi}$, $e_{mi-1}$, $e_{ni}$ and $e_{ni-1}$ is "1".

Figure 5:
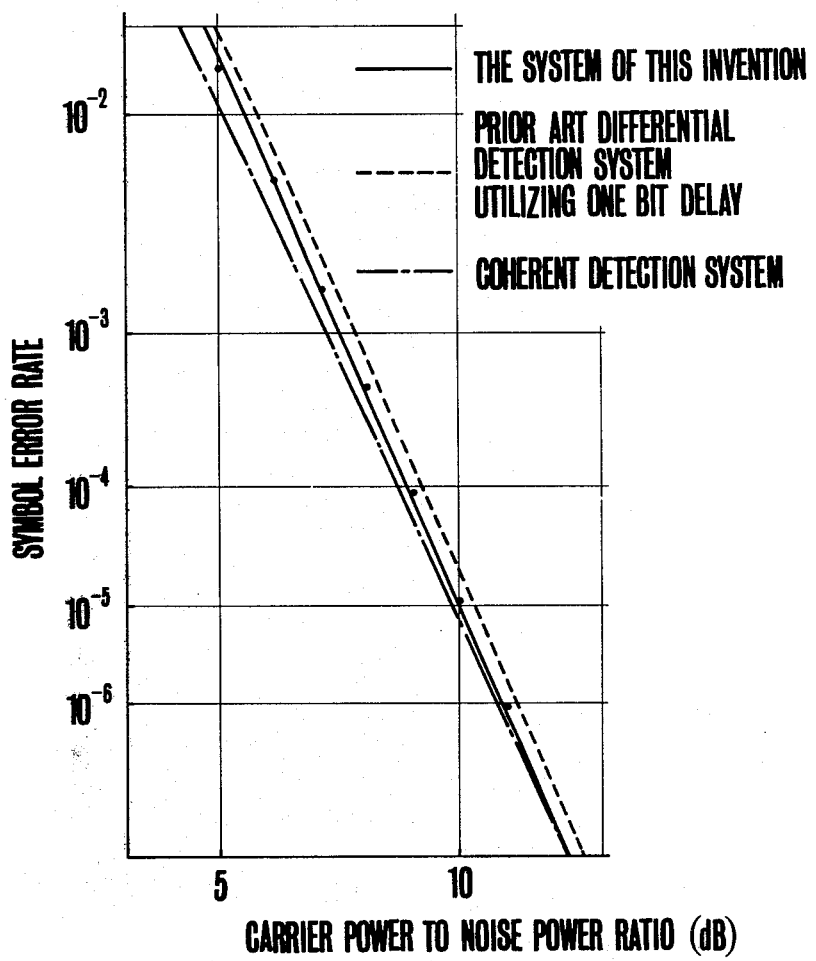
FIG. 5 is a graph showing the relationship between the error rate and the signal to noise power ratio of the demodulator shown in FIG. 2.

According to the analysis described above the output of the modulo 2 adder 63 is applied to a one bit delay unit 66 via a modulo 2 adder 65, and the syndrome which is the output of the one bit delay unit 66 and the syndrome which is the output of the modulo 2 adder 63 are applied to a coincidence circuit 67 which produces "1" only when both inputs are "1" but "0" in other cases. It is clear that the output of the coincidence circuit 67 represents $e_{mi-1}$, and this output is applied to the modulo 2 adder 68 together with the output of the one bit delay unit 61 where $e_{mi-1}$ is subtracted from $m_{i-1}$ thus producing the output of the decoder 60. The output of the coincidence circuit 67 is applied to the modulo 2 adder 65 for removing the effect of $e_{mi-1}$ from the syndrome which is the output of the adder 63, thus forming the syndrome tone utilized in the next signaling interval.

Where a decoder as shown in FIG. 2 is used, a theoretically derived error rate performance as shown in FIG. 5 is obtained. Various circuit elements constituting the decoder 60 may be of any conventional logic circuits. The one bit delay unit may be constituted by a shift register, while the modulo 2 adders may be constituted by exclusive OR gate circuits. The coincidence circuit may be constituted by an AND gate circuit. It is not necessary to use a binary inverter since binary inversion is to convert "0" into "0" and "1" into "1".

Figure 6:
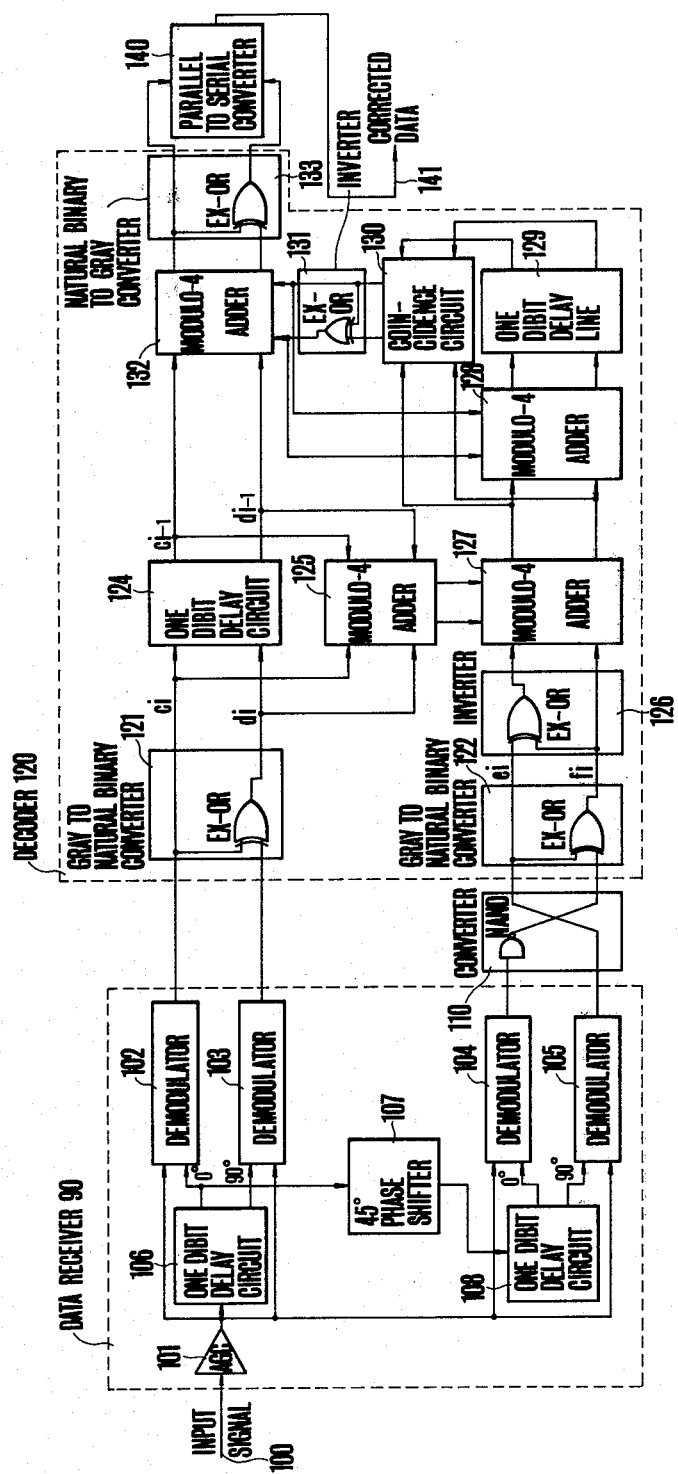
FIG. 6 is a block diagram showing one example of the demodulator when the differential detection system of this invention with non-redundant error correction is applied to a four phase DPSK modulated signal.

FIG. 6 shows one example of a differential detection system with non-redundant error correction which corresponds to the system shown in FIG. 1 when a four phase DPSK modulation signal is used. For the purpose of clear understanding, this example is constructed to correspond to that disclosed in U.S. Pat. No. 3,529,290. In FIG. 6 a data receiver 90 applies received four phase DPSK modulation signal 100 to demodulators 102, 103, 104 and 105, and one dibit delay circuit 106 respectively. Signal 100 is produced by converting a binary data sequence into pairs of bits (called dibits) in which a definite frequency carrier wave is phase shifted $+45°$ and $-45°$ respectively when dibits are "00" and "01" whereas phase shifted $+135°$ and $-135°$ respectively with respect to the absolute phase transmitted for the previous dibit where the dibits are "01" and "11" respectively. For this reason, 0° phase output of the one dibit delay circuit 106 is applied to both demodulator 102 and a 45° phase shifter 107, whereas 90° phase output is applied to a demodulator 103. The output of the 45° phase shifter 107 is sent to a one dibit delay circuit 108. A 0° phase output of this one debit delay circuit 108 is sent to demodulator 104 whereas 90° phase output is applied to a demodulator 105. From this configuration, it will be understood that the outputs of the demodulators 102 and 103 correspond to the output of the one signaling interval delay system, and that the outputs of the demodulators 104 and 105 correspond to the two signaling intervals delay system. A converter 110 is provided for the purpose of changing the relationship between the phase difference and dibit in the two signaling intervals delay system to the described for conventional DPSK system. The outputs of the one signaling interval delay system and the converter 110 are applied to gray to natural binary converters 121 and 122 of the decoder 120 which are used to convert gray codes into natural binary codes. When the outputs of the converter 121 for the $i$th signaling interval are denoted by $c_i$ and $d_i$ and the outputs of converter 122 by $e_i$ and $f_i$, $$A_i = 2 \times c_i + d_i$$

$$B_i = 2 \times e_i + f_i.$$

When there is no error in the transmission channel, $B_i$ is equal to the modulo 4 sums of $A_i$ and $A_{i-1}$ of the preceding signaling interval, thus $$B_i = A_i + A_{i-1} \text{ modulo } 4.$$

Accordingly, where there is an error in the transmission channel and $E_{Ai}$ and $E_{Bi}$ represent error symbols, the outputs of the converters 121 and 122 are expressed by the following equations.

$$R_{Ai} = A_i + E_{Ai} \text{ modulo } 4$$

$$R_{Bi} = B_i + E_{Bi} \text{ modulo } 4$$

A syndrome is expressed by the difference between the sum of the output $R_{Ai}$ of the converter 121 and the output $R_{Ai-1}$ of the converter 121 which is delayed by one signaling interval, and the output $R_{Bi}$ of the converter 122, thus $$S_i = R_{Ai} + R_{Ai-1} - R_{Bi} \text{ modulo } 4$$

$$= A_i + E_{Ai} + A_{i-1} + E_{Ai-1} - B_i - E_{Bi} \text{ modulo } 4$$

$$= A_i + A_{i-1} E_{Ai} + E_{Ai-1} - A_i - A_{i-1} - E_{Bi} \text{ modulo } 4$$

$$= E_{Ai} + E_{Ai-1} - E_{Bi} \text{ modulo } 4$$

The last equation consists of only error symbols. Supposing now that the effect of $E_{Ai-2}$ has been eliminated from the syndrome $S_{i-1}$ of the preceding signaling interval, the following equation holds.

$$S_{i-1} = E_{Ai-1} - E_{Bi-1} \text{ modulo } 4$$

Accordingly, it is possible to determine $E_{Ai-1}$ if less than one of the four elements which formes the two syndromes, that is $E_{Ai-1}$, $E_{Ai-1}$, $E_{Bi}$ and $E_{Bi-1}$ assumes a value other than 0, thus (i) if $S_i = S_{i-1} = 0$, $F_{Ai-1} = 0$ (ii) if $S_i \neq 0$ and $S_{i-1} = 0$, $E_{Ai-1} = 0$ (iii) if $S_i = 0$ and $S_{i-1} \neq 0$, $E_{Ai-1} = 0$ (iv) if $S_i = S_{i-1} = n \neq 0$, $E_{Ai-1} = n$ As $E_{Ai-1}$ is determined in this manner, it is possible to obtain a received data symbol in which an error has been corrected by subtracting $E_{Ai-1}$ from $R_{Ai-1}$. According to the analysis described above, the output of the code converter 121 is sent to a one dibit delay circuit 124 and a modulo 4 adder 125 which is connected to also receive the output of the delay circuit 124. The output of the modulo 4 adder 125 is applied to a modulo 4 adder 127 together with the output of the converter 122 which is inverted by an inverter 126. The output of the modulo 4 adder 127 which is the syndrome is applied to one signaling interval delay circuit 129 through another modulo 4 adder 128. The syndrome which is the output of the delay circuit 129 and the syndrome which is the output of the modulo 4 adder 127 are applied to a coincidence circuit 130 which produces the same symbol as that of the inputs but 0 in other cases. It will be clearly understood that the output of this coincidence circuit represents $E_{Ai-1}$. The output of the coincidence circuit 130 inverted by an inverter 131 is applied to a modulo 4 adder 132 together with the output of the one signaling interval delay circuit 124 thus correcting the error of the received data symbol. The output of the inverter 131 is also sent to the modulo 4 adder 128 for removing the effect of $E_{Ai-1}$ from the syndrome which is the output of the modulo 4 adder 127. The output of the modulo 4 adder 132 is sent to a converter 133 which converts natural binary codes into gray codes and also to a parallel to serial converter 140 for obtaining a received binary data sequence, from which the error has been eliminated, or a corrected data 141.

Figure 9:
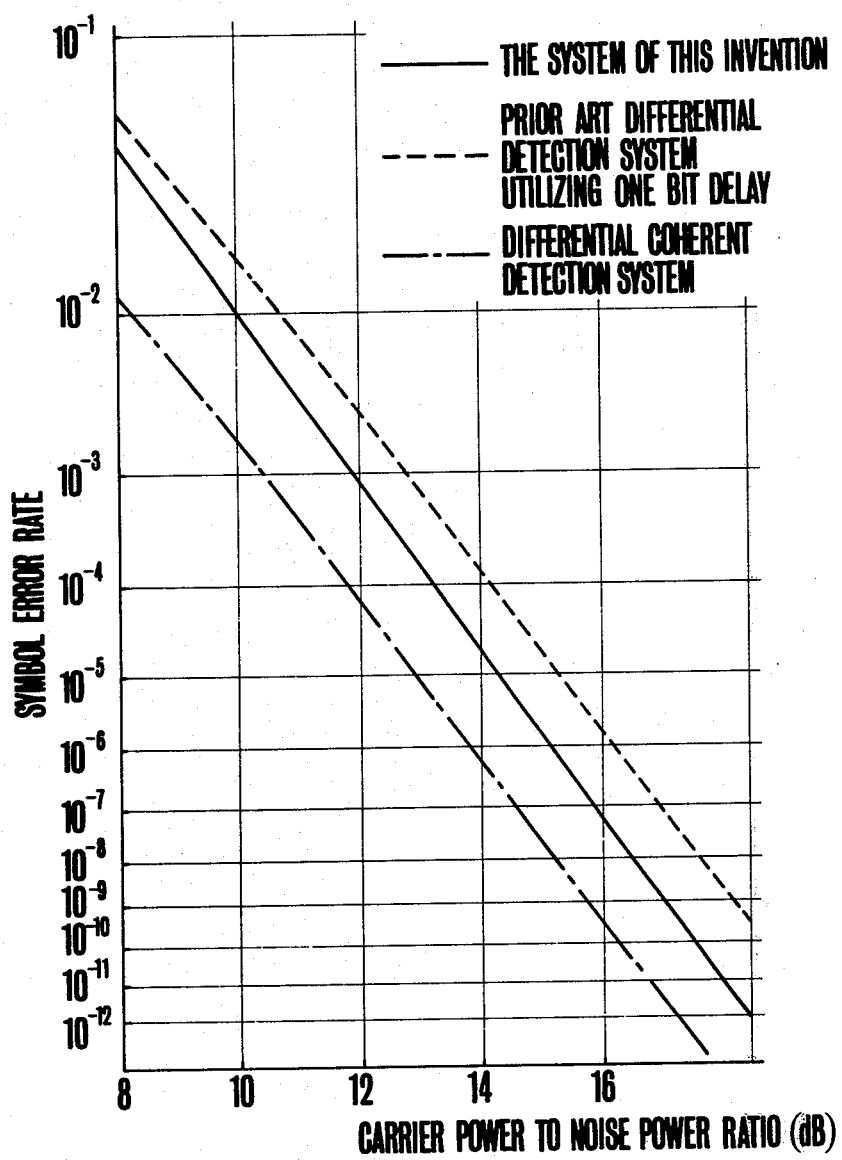

FIG. 9 is a graph showing an error rate performance theoretically obtained from the four phase DPSK modulation system. As can be understood from FIG. 9, as the carrier power to noise power ratio (C/N) increases the performance becomes closer to the coherent detection performance. This means that according to this invention it is possible to obtain a satisfactory error rate performance without utilizing any complicated carrier recovery circuit as in the coherent detection system.

Figure 7:
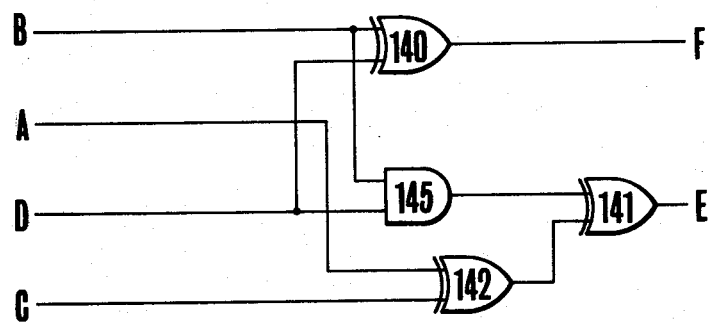
FIG. 7 shows a connection diagram of a modulo-4 adder.
Figure 8:
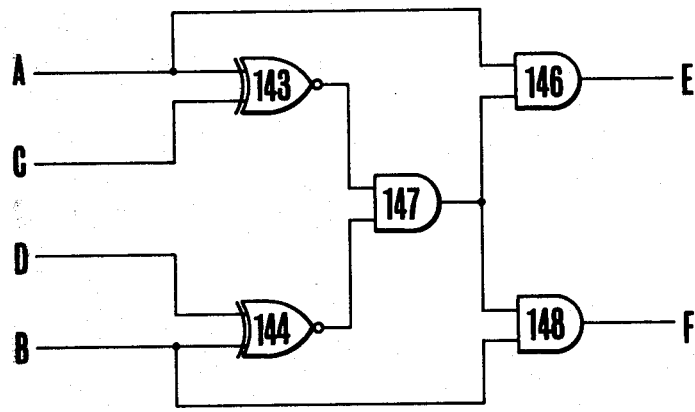
FIG. 8 is a connection diagram showing one example of a coincidence circuit when the invention is applied to demodulate a four phase DPSK modulated signal and FIG. 9 is a graph showing the relationship between error rate and the signal to noise power ratio of the demodulator shown in FIG. 6.

To have better understanding of the system embodying the invention, examples of the modulo 4 adder and the coincidence circuit utilized in the decoder for the 4 phase DPSK modulation signal or 4 value CPFSK modulation are shown in FIGS. 7 and 8 respectively. These figures are circuit constructions suitable for processing natural binary coded 4 level digital signals, in which the inputs are grouped into A and B and C and D. Reference numerals 140', 141' and 142 through 144 represent exclusive OR gate circuits, 146 through 148 AND gate circuits, and E and F the outputs. The validity chart of the modulo 4 adder shown in FIG. 7 is as follows.

| C,D \ A,B | 00 | 01 | 10 | 11 |
|---|---|---|---|---|
| 00 | 00 | 01 | 10 | 11 |
| 01 | 01 | 10 | 11 | 00 |
| 10 | 10 | 11 | 00 | 01 |
| 11 | 11 | 00 | 01 | 10 |

The validity chart of the coincidence circuit shown in FIG. 8 is as follows.

| C,D \ A,B | 00 | 01 | 10 | 11 |
|---|---|---|---|---|
| 00 | 00 | 00 | 00 | 00 |
| 01 | 00 | 01 | 00 | 00 |
| 10 | 00 | 00 | 10 | 00 |
| 11 | 00 | 00 | 00 | 11 |

The gray code to natural code converter and the inverter may be constituted by exclusive OR gate circuits.

What is claimed is:

1. A differential detection system with non-redundant error correction comprising first delay means for delaying by $n$ ($n$ is an interger) signaling intervals a received signal comprising a carrier wave modulated by $m$ ($m$ is an interger) level digital data; a first phase comparator for comparing the phase of the output of said first delay means and the phase of a signal received in the present signaling interval to detect a first symbol; second delay means for delaying said first mentioned received signal by $2n$ signaling intervals; a second phase comparator for comparing the phase of the output of said second delay means and the phase of the signal received in the present signaling interval to detect a second symbol; and a decoder responsive to the first and second symbols produced by said first and second phase comparators respectively, said decoder comprising third delay means for delaying said first symbol by $n$ signaling intervals, a first modulo $m$ adder for performing a modulo $m$ addition operation of the output of said third delay means and said first symbol, a second modulo $m$ adder for performing a modulo $m$ addition operation of the output of said first modulo $m$ adder and an inverted output of said second phase comparator, a third modulo $m$ adder connected to receive the output of said second modulo $m$ adder, fourth delay means for delaying the output of said third modulo $m$ adder by $n$ signaling intervals, a logic circuit for determining the coincidence between the output of said fourth delay means and the output of said second modulo $m$ adder, a fourth modulo $m$ adder for performing a modulo $m$ addition operation of an inverted output of said logic circuit and the output of said third delay means, and means for applying said inverted output of said logic circuit to one input of said third modulo $m$ adder.

2. The differential detection system according to claim 1 wherein said $m$ is equal to 2 and said $n$ is equal to 1.

3. The differential detection system according to claim 2 wherein said first phase comparator comprises a sine phase comparator and said second phase comparator comprises a cosine phase comparator.

4. The differential detection system according to claim 3 wherein the outputs of said first and second comparators are sent to a succeeding stage respectively through first and second regenerators.

5. The differential detection system according to claim 1 wherein said $m$ is equal to 2, said $n$ is equal to 1 and said decoder comprises a decoder for a rate ½ single error corresponding self-orthogonal convolutional code.

6. The differential detection system according to claim 1 wherein said $m$ is equal to 4 and said $n$ is equal to 2.

7. The differential detection system according to claim 1 wherein said received signal comprises a phase continuous frequency shift keying signal.

8. The differential detection system according to claim 1 wherein said received signal comprises a $m$ phase differential phase shift keying signal.

9. The differential detection system according to claim 1 wherein said decoder comprises a converter for converting gray codes into natural binary codes.

* * * * *